Patented Nov. 28, 1933

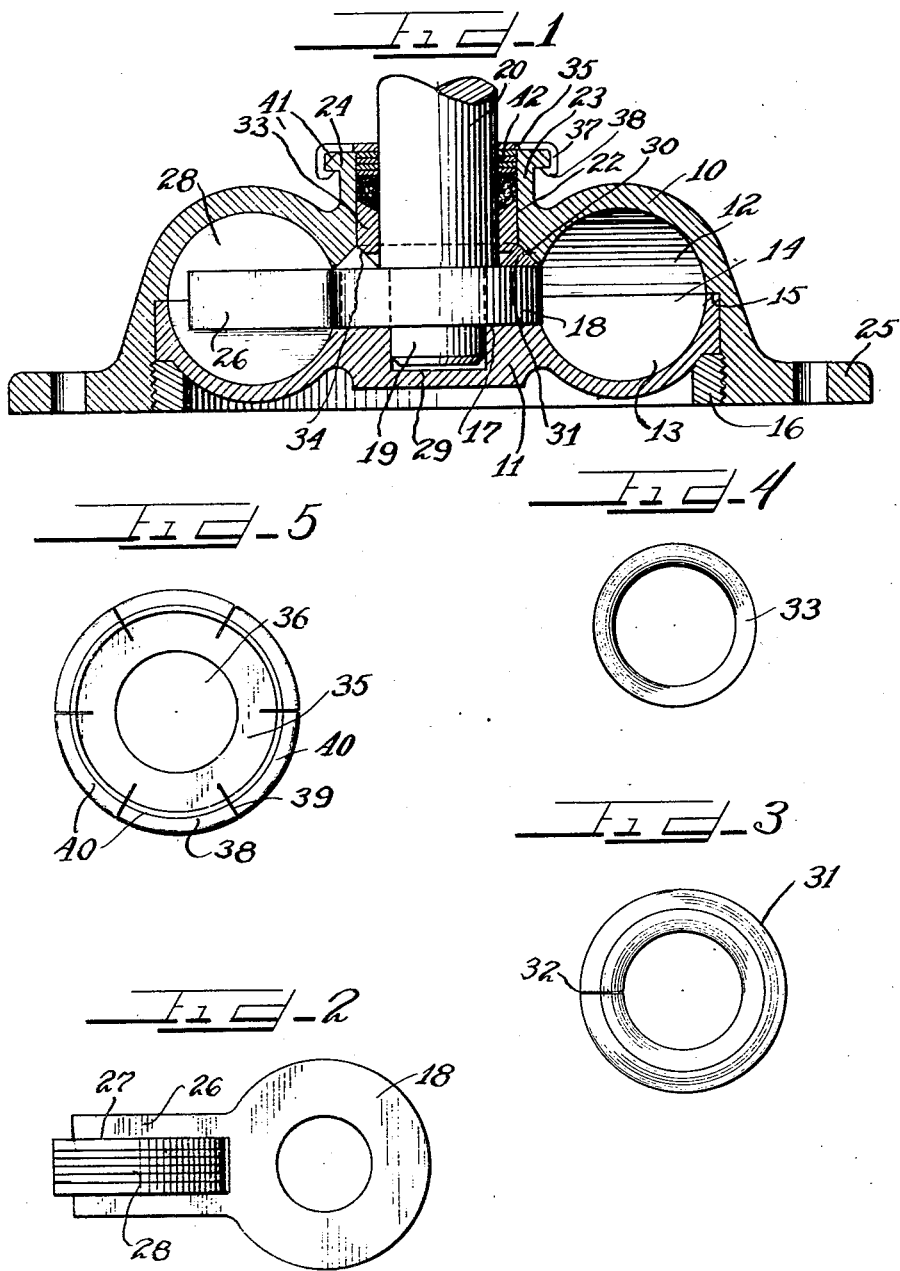

1,937,496

UNITED STATES PATENT OFFICE 1,937,496

STUFFING BOX STRUCTURE

Richard S. M. Mitchell, Detroit, Mich., assignor of fifteen per cent to A. H. Golden, Stamford, Conn.

Application January 28, 1931. Serial No. 511,794

7 Claims. (Cl. 286—7)

My invention relates to improved bearing and stuffing box structure which is adapted for general use but which is designed particularly for use in structures such as shock absorbers of the polar type comprising a cylinder member, a shaft member, and piston structure carried with the shaft to travel within the cylinder structure against the resistance of a fluid in the cylinder bore, such as oil.

An important object of the invention is to provide improved bearing and stuffing box assembly and arrangement for accurately holding the piston supporting element against the bearing surfaces and to afford bearing surface for the shaft element and at the same time to prevent escape or leakage of fluid from the cylinder bore through the bearing passage for the shaft.

A further object of the invention is to provide improved means and arrangement for automatically compensating for wear so as to at all times maintain proper bearing relation and prevent escape or leakage of fluid.

The above referred to and other features of the invention are incorporated in the structure shown on the drawing, in which drawing Figure 1 is a diametral section of a cylinder structure showing the shaft and piston elements therein and showing also the bearing and stuffing box arrangement and assembly;

Figure 2 is a plan view of the hub structure which supports the piston element;

Figure 3 is a plan view of a bearing and sealing annulus;

Figure 4 is a plan view of a bearing ring; and

Figure 5 is an inner elevational view of the closure cap.

The device shown on the drawing and to which my invention is applied, represents a shock absorber structure of the polar type in which a piston member travels in an annular cylinder bore. The structure comprises the outer and inner frames 10 and 11 having at their outer sections the annular deflections 12 and 13 each of semi-circular cross-section and which, when the two frames are secured together, form the annular cylinder bore 14. To accurately align and secure the frames together, the frame 10 is recessed to form a shoulder 15, the frame 11 engaging at its periphery in the recess and abutting said shoulder and being secured in place by a ring 16 threading into the frame 10. The opposed walls of the frame provide a cylindrical space 17 which communicates with and is surrounded by the cylinder bore and which is concentric therewith. Within this cylindrical space is the cylindrical hub 18 which is secured to the lower reduced end 19 of a shaft 20 which extends outwardly through a bearing passageway 22 extending from the space 17, this passageway being surrounded by the annular wall 23 which terminates in a head 24. In practice, the outer end of the shaft has an arm (not shown) secured thereto which is adapted to be connected with the axle of a vehicle, and the frame 11 has ears 25 extending therefrom whereby it may be secured to a support such as the chassis of a vehicle.

Extending from the hub 18 into the cylinder passageway is an arm 26 having the radial slot 27 for supporting and guiding a piston structure 28 which engages in the cylinder bore to travel therein against the resistance of fluid such as oil contained in the cylinder.

At its lower end the shaft has bearing in a pocket 29 in the frame 11 and the hub 18 has bearing on the surface of the frame 11 surrounding the pocket. The annular corner between the passageway 22 and the cylinder bore is cut away to leave the beveled surface 30 which forms the seat for a bearing ring 31 of triangular cross section, this ring being split as indicated at 32. The ring is of spring material and receives the shaft to bear against the top of the hub 18 and with its outer inclined face against the beveled seat 30. When this bearing ring is applied it is sprung more or less into position so that the engagement of the seat 30 with its outer inclined face will tend to hold the ring downwardly in intimate bearing engagement with the hub.

Within the passage 22 above the hub bearing ring 31 is a solid unbroken bearing ring 33 with which the shaft has bearing engagement and which engages the wall of the passageway 22. The lower outer edge of this shaft bearing ring is tapered to form the inclined seat 34 which engages with and fits against the inner inclined surface of the hub bearing ring 31. The upper edge of the ring 33 is tapered inwardly and above the ring packing material 35 inserted in the passageway 22.

The closure cap C for the outer end of the passageway 22 is clearly shown in Figures 1 and 5. The cap has the central opening 36 for receiving the shaft so that this cap will provide additional bearing for the shaft. The peripheral section of the ring is deflected downwardly to form a cylindrical flange 37 whose lower section is deflected radially inwardly to form the horizontal flange 38 whose inner corner is beveled as shown. The flange sections of the ring are slotted radially at regular intervals as indicated at 39 to form spring sections 40. The outer upper corner of the head 24 is beveled as indicated at 41 and to apply the cap it is slipped over the shaft and then axial pressure is applied in response to which the sections 40 will spring outwardly as the beveled end of the flange 30 travel along the beveled edge 41 of the head and when the cap is brought against the outer end of the head the flanges 38 will spring into position below the head thus to lock the cap firmly in place.

Between the cap and the packing are introduced abutment means for transmitting pressure from the cap to the packing. Such abutment means may be a solid ring, or a plurality of washers, or as shown it may be a helical spring 42 formed from a band of spring metal of rectangular cross-section and of a width to extend between the shaft and the wall of the passageway 22. Before the cap is applied to the head 24 the spring is inserted against the packing and then when the head is clamped into place the spring is compressed and will exert pressure against the packing and this pressure will be transmitted by the shaft bearing ring 33 to the hub bearing ring 31. This pressure against the ring 31 will hold it securely in bearing engagement with the hub 18 and at the same time the engagement of the beveled surface of the ring 33 with the inner inclined surface of the ring 31 will expand the ring and hold it intimately against the seat 30. The pressure exerted by the spring abutment member will also be transmitted to the hub which will be accurately and securely held against its seat around the bearing pocket 29. As the bearing surfaces wear, such wear is taken up by the pressure and there will always be an effective and efficient seal against the escape of fluid from the cylinder bore into and through the passageway 22.

If it is desired at any time to replace the packing in the stuffing box or other parts therein, the cap can be readily removed from the head 24 by springing back the sections 40 with a suitable tool. After replacements have been made the cover can be readily reapplied by pressure.

Although I have shown an efficient and practical embodiment of the features of my invention, I do not desire to be limited to the exact details shown and described as changes and modifications may be made without departing from the scope and principles of the invention as outlined in the appended claims.

I claim as follows:

1. In combination, a housing having a passage extending to the exterior thereof, a shaft extending through said passage, an operating member within said housing below said passage and secured to said shaft to rotate therewith, a bearing ring at the bottom of said passage seating against said operating member and having inclined inner and outer faces, a bearing ring in said passage above said first mentioned ring and having a beveled lower surface engaging the inner inclined face of said first mentioned ring, packing material in said passage above said last mentioned ring, and a cap on said housing closing said passage and adapted to exert pressure against said packing and said rings.

2. In combination, a housing having a passage to the exterior thereof, a shaft extending through said passage into said housing, an operating member seated on its lower face on a wall of said housing below said passage, a lower ring in said passage bearing against said operating member and having outer and inner inclined lateral faces, the outer edge of said housing at the bottom of said passage being beveled to fit the outer inclined surface of said lower ring, an upper ring within said passage forming a bearing for said shaft and having a lower beveled surface seating against the inner inclined surface of said lower ring, packing material within said passage above said upper ring, and a closure for the outer end of said passage secured to the housing and adapted to exert pressure against said packing and said rings.

3. In combination, a housing having a passage to the exterior thereof, a shaft extending through said passage into said housing, an operating member seated on its lower face on a wall of said housing below said passage, a lower ring in said passage bearing against said operating member and having outer and inner inclined lateral faces, the outer edge of said housing at the bottom of said passage being beveled to fit the outer inclined surface of said lower ring, an upper ring within said passage forming a bearing for said shaft and having a lower beveled surface seating against the inner inclined surface of said lower ring, packing material within said passage above said upper ring, and a closure for the outer end of said passage secured to the housing and adapted to exert pressure against said packing and said rings, said lower ring being split transversely.

4. In combination, a housing having a passageway to the exterior, a shaft extending through said passage into said housing and having bearing in a lower wall thereof, an operating member within said housing bearing at its lower side on said wall and being secured to said shaft to rotate therewith, a spring ring at the lower end of said passage of triangular section and seating with its lower face on the upper side of said operating member with its inclined sides projecting upwardly, said housing at the lower end of said passage being beveled to fit the outer inclined side of said spring ring, a bearing ring for said shaft in said passage having a lower beveled surface engaging the inner inclined side of said spring ring, packing within said passage above said bearing ring, and a closure for the outer end of said passage secured to said housing and adapted to exert pressure against said packing and said rings.

5. In combination, a housing and a passage leading to the exterior of the housing, a shaft extending through said passage into said housing and having bearing in a lower wall thereof, an operating hub bearing with its lower face on said lower wall and being secured to said shaft to rotate therewith, a split ring of triangular cross section at the lower end of said passage engaging with its lower face against the top of said hub, said housing at the lower end of said passage being beveled to be engaged by the outer side face of said split ring, a bearing ring for said shaft in said passage above said split ring and having a beveled surface at its lower end for engaging the inner inclined surface of said split ring, a closure cap for the outer end of said passage secured to said housing, and resilient means between said cap and said shaft bearing ring for exerting pressure against said ring and said split ring to hold said rings intimately in bearing engagement and said hub in bearing engagement with its seat.

6. In combination, a housing having a passageway to the exterior, a shaft extending through said passageway, a stuffing box for said shaft comprising a split ring having a triangular cross-section and surrounding said shaft while pressing one of its angular faces against a cooperating angular face on said housing, means limiting downward movement of said split ring, a second ring tightly surrounding the shaft and pressed against another of the angular faces of said split ring whereby to press said first face of the ring against said contacting surface on the housing whereby to maintain an inherently tight sealing joint.

7. In combination, a housing having a passageway to the exterior, a shaft extending through said passageway, an operating member secured to said shaft and having an under face bearing against a wall in said housing, a stuffing box for said shaft comprising a split ring resting on the upper face of said operating member, said ring being of triangular cross section and surrounding said shaft while pressing one of its angular faces against a cooperating angular face on said housing, a second ring surrounding the shaft and pressed against another of the angular faces of said split ring so as to press said first face of the ring against the contacting surface of the housing whereby to maintain an inherently tight sealing joint.

RICHARD S. M. MITCHELL.